(12) United States Patent
Kim

(10) Patent No.: US 9,294,163 B2
(45) Date of Patent: Mar. 22, 2016

(54) APPARATUS AND METHOD FOR SELECTING BEAM IN WIRELESS COMMUNICATION SYSTEM

(75) Inventor: Yung-Soo Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 429 days.

(21) Appl. No.: 13/590,594

(22) Filed: Aug. 21, 2012

(65) Prior Publication Data

US 2013/0051302 A1 Feb. 28, 2013

(30) Foreign Application Priority Data

Aug. 24, 2011 (KR) .................. 10-2011-0084486

(51) Int. Cl.
*H04B 7/04* (2006.01)
*H04B 7/06* (2006.01)
*H01Q 25/00* (2006.01)
*H04W 16/28* (2009.01)

(52) U.S. Cl.
CPC ........... *H04B 7/0408* (2013.01); *H01Q 25/002* (2013.01); *H04B 7/0617* (2013.01); *H04W 16/28* (2013.01)

(58) Field of Classification Search
CPC ...... H04B 7/0408; H04B 7/06; H04B 7/0617; H01Q 25/002; H04W 16/28
See application file for complete search history.

(56) References Cited

U.S. PATENT DOCUMENTS

| | | | |
|---|---|---|---|
| 5,621,752 A * | 4/1997 | Antonio et al. ............... | 375/144 |
| 6,349,217 B1 | 2/2002 | Honcharenko et al. | |
| 6,950,678 B1 | 9/2005 | Mujtaba et al. | |
| 7,289,826 B1 | 10/2007 | Hovers et al. | |
| 7,346,365 B1 | 3/2008 | Hovers et al. | |
| 7,596,387 B2 | 9/2009 | Goldberg et al. | |
| 7,826,854 B2 | 11/2010 | Hovers et al. | |
| 8,331,197 B2 | 12/2012 | Stytsenko et al. | |
| 2003/0157898 A1* | 8/2003 | Ylitalo ......................... | 455/67.5 |
| 2006/0145919 A1* | 7/2006 | Pleva et al. .................... | 342/368 |
| 2006/0183503 A1* | 8/2006 | Jeffrey Goldberg ..... | H01Q 3/08 455/561 |
| 2009/0028128 A1* | 1/2009 | Trott ........................ | H04B 7/26 370/350 |
| 2011/0032866 A1* | 2/2011 | Leabman ............... | H01Q 1/246 370/316 |

(Continued)

FOREIGN PATENT DOCUMENTS

| | | |
|---|---|---|
| CN | 1325241 A | 12/2001 |
| JP | 2001-251123 A | 9/2001 |
| JP | 2007-110365 A | 4/2007 |

(Continued)

OTHER PUBLICATIONS

Alcatel-Lucent Shanghai Bell et al., Considerations on CSI Feedback Enhancements for High-Priority Antenna Configurations, Agenda Item 6.6.2.1, 3GPP TSG-RAN WG1 #66, Athens, Greece, Aug. 22-26, 2011, R1-112420, 3GPP, Sophia-Antipolis, France.

(Continued)

*Primary Examiner* — Xavier S. Wong
(74) *Attorney, Agent, or Firm* — Jefferson IP Law, LLP

(57) ABSTRACT

An apparatus and a method for selecting a beam in a wireless communication system capable of forming a plurality of antenna beams are provided. The method for transmitting signals includes transmitting a training signal by using a plurality of first beams and a plurality of second beams, and transmitting at least one of user control information and data by using at least one fourth beam among a plurality of third beams.

17 Claims, 12 Drawing Sheets

(56) References Cited

U.S. PATENT DOCUMENTS

2012/0142288 A1* 6/2012 Hosoya et al. .................. 455/84
2013/0258868 A1* 10/2013 Davis .................. H04B 7/0689
 370/252

FOREIGN PATENT DOCUMENTS

| KR | 10-2001-0107712 A | 12/2001 |
| KR | 10-2009-0010072 A | 1/2009 |
| WO | 2007/130032 A1 | 11/2007 |
| WO | 2009/020404 A1 | 2/2009 |

OTHER PUBLICATIONS

3rd Generation Partnership Project; Technical Specification Group Radio Access Network; Evolved Universal Terrestrial Radio Access (E-UTRA); Physical Channels and Modulation (Release 10), Jun. 22, 2011, pp. 1-103, 3GPP TS 36.211 V10.2.0, 3GPP, Sophia-Antipolis, France.

* cited by examiner

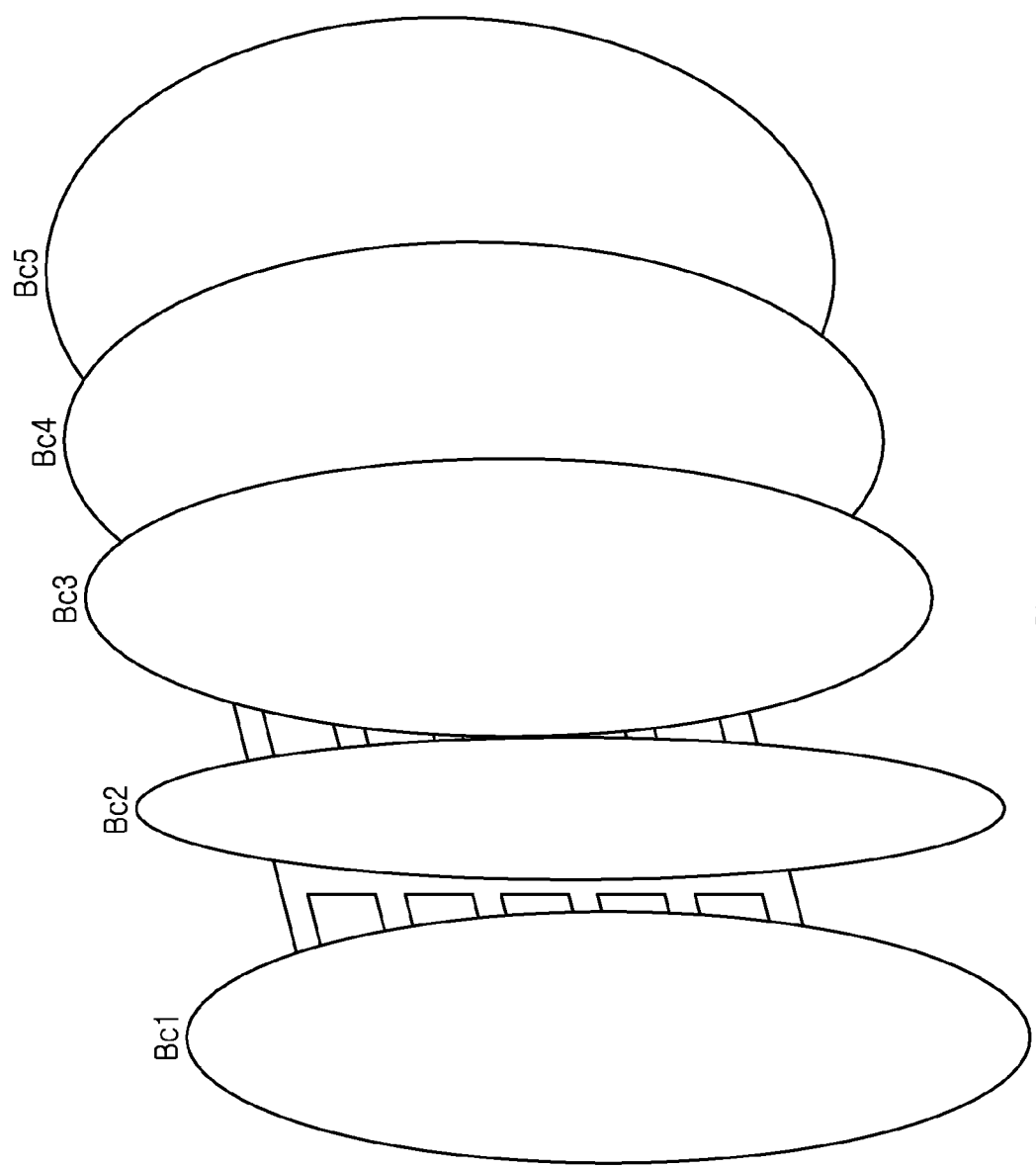

APPARATUS AND METHOD FOR SELECTING BEAM IN WIRELESS COMMUNICATION SYSTEM

PRIORITY

This application claims the benefit under 35 U.S.C. §119 (a) of a Korean patent application filed on Aug. 24, 2011 in the Korean Intellectual Property Office and assigned Serial No. 10-2011-0084486, the entire disclosure of which is hereby incorporated by reference.

BACKGROUND OF THE INVENTION

1. Field of the Invention

The present invention relates to a wireless communication system. More particularly, the present invention relates to an apparatus and a method for selecting a beam in a wireless communication system that uses a plurality of antenna beams.

2. Description of the Related Art

Wireless communication systems can increase a data transmission rate by using a beamforming technique. The beamforming technique refers to a series of techniques that can improve transmission/reception (TX/RX) performance by using high-gain antennas.

When the beamforming technique is used, a wireless communication system should reduce the width of an antenna beam in order to increase an antenna gain. In this case, the wireless communication system should use a plurality of narrow-width beams (hereinafter referred to as narrow beams) in order to transmit a signal in all directions.

A wireless communication system beamforms not only data but also a synchronization (sync) signal and a common control signal. The sync signal and the common control signal are used commonly by a plurality of Mobile Stations (MSs). Accordingly, when narrow beams are used to transmit a sync signal and a common control signal, a Base Station (BS) has an overhead of having to repeatedly transmit the same sync signal and the same common control signal through narrow beams in all directions.

In order to reduce a beamforming overhead by a sync signal and a common control signal, a wireless communication system uses wide beams to transmit the sync signal and the common control signal.

However, when a wireless communication system uses wide beams, an inter-signal interference increases due to multi-path fading.

Furthermore, when using an Orthogonal Frequency Division Multiplexing (OFDM) scheme, the wireless communication system sets a Cyclic Prefix (CP) to be large in order to reduce an OFDM inter-symbol interference. In this case, an overhead increases due to the CP in the wireless communication system.

When a transmitting terminal changes a narrow beam transmitting a signal, a signal interference occurs due to multi-path fading in the wireless communication system as in the case of using wide beams.

In order to increase a transmission rate, the wireless communication system may simultaneously communicate signals with a plurality of mobile stations by using a plurality of beams. In this case, in the wireless communication system, a signal interference may occur due to multi-path fading by signals communicated with other mobile stations.

Therefore, a need exists for an apparatus and a method for reducing a beamforming overhead in a wireless communication system using a beamforming technique.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for reducing a beamforming overhead in a wireless communication system using a beamforming technique.

Another aspect of the present invention is to provide an apparatus and a method for reducing a beamforming interference in a wireless communication system using a beamforming technique.

Another aspect of the present invention is to provide an apparatus and a method for reducing a beamforming overhead and interference in a wireless communication system using a beamforming technique.

Another aspect of the present invention is to provide an apparatus and a method for reducing an overhead and interference caused by transmission of a sync signal and a common control signal in a wireless communication system using a beamforming technique.

Another aspect of the present invention is to provide an apparatus and a method for reducing an overhead and interference caused by transmission of a training signal in a wireless communication system using a beamforming technique.

Another aspect of the present invention is to provide an apparatus and a method for reducing an interference caused by a beam change in a wireless communication system using a beamforming technique.

Another aspect of the present invention is to provide an apparatus and a method for reducing an interference caused by simultaneous use of a plurality of beams in a wireless communication system using a beamforming technique.

In accordance with an aspect of the present invention, a method for transmitting signals by a transmitting terminal in a wireless communication system capable of forming a plurality of antenna beams is provided. The method includes transmitting a training signal by using a plurality of first beams and a plurality of second beams, and transmitting at least one of user control information and data by using at least one fourth beam among a plurality of third beams, wherein the plurality of first beams are horizontally narrow and vertically wide, the plurality of second beams are horizontally wide and vertically narrow, and the plurality of third beams are horizontally narrow and vertically narrow.

In accordance with another aspect of the present invention, a method for receiving signals by a receiving terminal in a wireless communication system capable of forming a plurality of antenna beams is provided. The method includes selecting any one third beam and any one fourth beam among a plurality of first beams and a plurality of second beams through which a training signal is received from a transmitting terminal, and selecting any one sixth beam among a plurality of fifth beams by using the third beam and the fourth beam, wherein the plurality of first beams are horizontally narrow and vertically wide, the plurality of second beams are horizontally wide and vertically narrow, and the plurality of fifth beams are horizontally narrow and vertically narrow.

In accordance with another aspect of the present invention, an apparatus of a transmitting terminal in a wireless communication system capable of forming a plurality of antenna beams is provided. The apparatus includes an antenna unit including a plurality of antennas, a beam selecting unit configured to select any one of a plurality of antenna beams, a Radio Frequency (RF) chain configured to form the antenna beam selected by the beam selecting unit, and a control unit configured to transmit a training signal by using a plurality of first beams and a plurality of second beams, and to transmit at least one of user control information and data by using any one fourth beam among a plurality of third beams, wherein the plurality of first beams are horizontally narrow and vertically wide, the plurality of second beams are horizontally wide and vertically narrow, and the plurality of third beams are horizontally narrow and vertically narrow.

In accordance with another aspect of the present invention, an apparatus of a receiving terminal in a wireless communication system capable of forming a plurality of antenna beams is provided. The apparatus includes a receiving unit configured to receive signals, and a control unit configured to select any one third beam and any one fourth beam among a plurality of first beams and a plurality of second beams through which a training signal is received from a transmitting terminal through the receiving unit, and to select any one sixth beam among a plurality of fifth beams by using the third beam and the fourth beam, wherein the plurality of first beams are horizontally narrow and vertically wide, the plurality of second beams are horizontally wide and vertically narrow, and the plurality of fifth beams are horizontally narrow and vertically narrow.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 5A and 5B illustrate wide beam patterns according to exemplary embodiments of the present invention;

Throughout the drawings, it should be noted that like reference numbers are used to depict the same or similar elements, features, and structures.

DETAILED DESCRIPTION OF EXEMPLARY EMBODIMENTS

Figure 1:
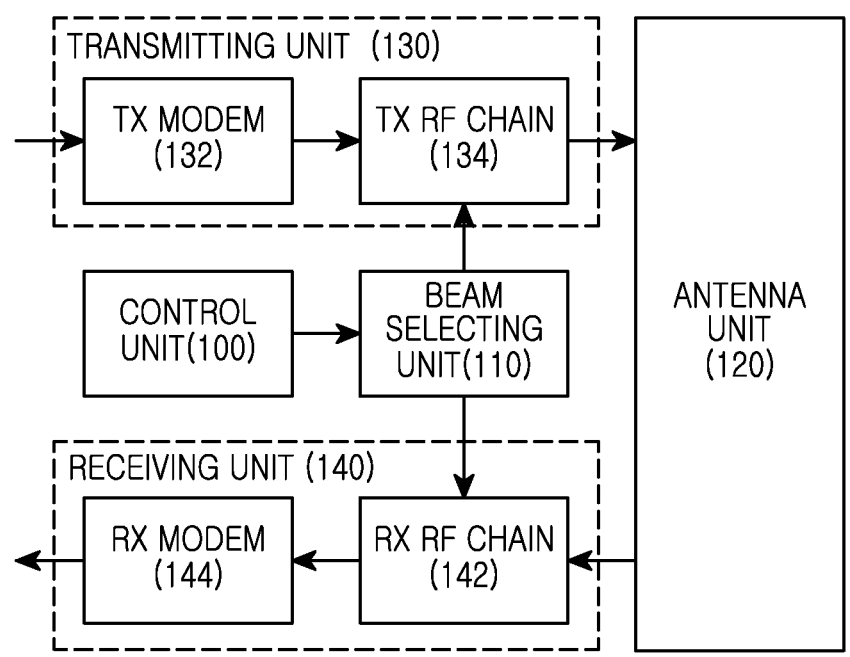
FIG. 1 is a block diagram illustrating a configuration of a transmitting terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention will be described herein below with reference to the accompanying drawings. In the following description, detailed descriptions of well-known functions or configurations will be omitted since they would unnecessarily obscure the subject matters of the present invention. In addition, the terms used herein are defined according to the functions in exemplary embodiments of the present invention. Thus, the terms may vary depending on users' or operators' intentions or practices. Therefore, the terms used herein should be understood based on the descriptions made herein.

Exemplary embodiments of the present invention provide a scheme for reducing a beamforming overhead and interference in a wireless communication system using a beamforming technique.

In the following description, it is assumed that a wireless communication system uses an antenna beamforming technique. The antenna beamforming technique refers to a technique for forming a beam by shifting the phase of a Radio Frequency (RF) signal transmitted/received through each antenna.

FIGS. 1 through 10, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 is a block diagram illustrating a configuration of a transmitting terminal according to an exemplary embodiment of the present invention.

Referring to FIG. 1, the transmitting terminal may include a control unit 100, a beam selecting unit 110, an antenna unit 120, a transmitting (TX) unit 130, and a receiving (RX) unit 140. The transmitting unit 130 includes a TX modem 132 and a TX RF chain 134. The receiving unit 140 includes an RX RF chain 142 and an RX modem 144.

The control unit 100 controls the transmitting terminal to form a beam. For example, when a user control signal and data are transmitted, the control unit 100 controls the beam selecting unit 110 to transmit at least one of the user control signal and the data through a narrow beam. Herein, a beam for transmission of at least one of the user control signal and the data is selected by the transmitting terminal or a receiving terminal. In an exemplary implementation, when a synchronization (sync) signal and a common control signal are transmitted, the control unit 100 controls the beam selecting unit 110 to transmit at least one of the sync signal and the common control signal through a vertical beam. In an exemplary implementation, when a training signal is transmitted, the control unit 100 controls the beam selecting unit 110 to transmit the training signal through a vertical beam and a horizontal beam sequentially so that the receiving terminal can select an optimal narrow beam. Herein, the narrow beam refers to a beam that is narrow both vertically and horizontally as illustrated in FIG. 4B. The vertical beam refers to a beam that is horizontally narrow and vertically wide as illustrated in FIG. 5A. The horizontal beam refers to a beam that is vertically narrow and horizontally wide as illustrated in FIG. 5B. In addition, the common control signal includes various information on the system and information needed for connection to the system, and the user control signal includes resource allocation information and control information.

In addition, when a beam change occurs, the control unit 100 controls the beam selecting unit 110 to select a narrow beam having a different beam angle. In this case, the control unit 100 converts a beam so that a beam direction change is maximum in a vertical direction. For example, when narrow beams illustrated in FIG. 4B are available, the control unit 100 converts beams in the order of B1$i$→B3$j$→B5$k$→B2$m$→B4$n$. Herein, i, j, k, m, n represent indexes of vertical direction antenna elements.

If a beam is converted only in a vertical direction, the control unit 100 converts a beam so that a beam change is minimum in the horizontal direction. For example, when vertical beams illustrated in FIG. 5A are available, the control unit 100 converts beams in the order of Bc1→Bc2→Bc3→Bc4→Bc5. Herein, c represents an index of a vertical direction antenna element.

When the transmitting unit 130 transmits signals simultaneously through a plurality of beams to a plurality of receiving terminals, the control unit 100 controls the beam selecting unit 110 so that beams with the same vertical direction angle are not simultaneously used.

The beam selecting unit 110 selects a beam of a relevant pattern under the control of the control unit 100. For example, when data is transmitted, the beam selecting unit 110 selects a narrow beam in a direction selected by a receiving terminal under the control of the control unit 100. In an exemplary implementation, when a sync signal and a common control signal are transmitted, the beam selecting unit 110 selects a vertical beam under the control of the control unit 100. In an exemplary implementation, when a training signal is transmitted, the beam selecting unit 110 selects a vertical beam and a horizontal beam sequentially under the control of the control unit 100.

In transmission beamforming, the beam selecting unit 110 transmits information on a selected beam pattern to the transmitting unit 130 under the control of the control unit 100. In addition, in reception beamforming, the beam selecting unit 110 transmits information on a selected beam pattern to the transmitting unit 140 under the control of the control unit 100.

Figure 2B:
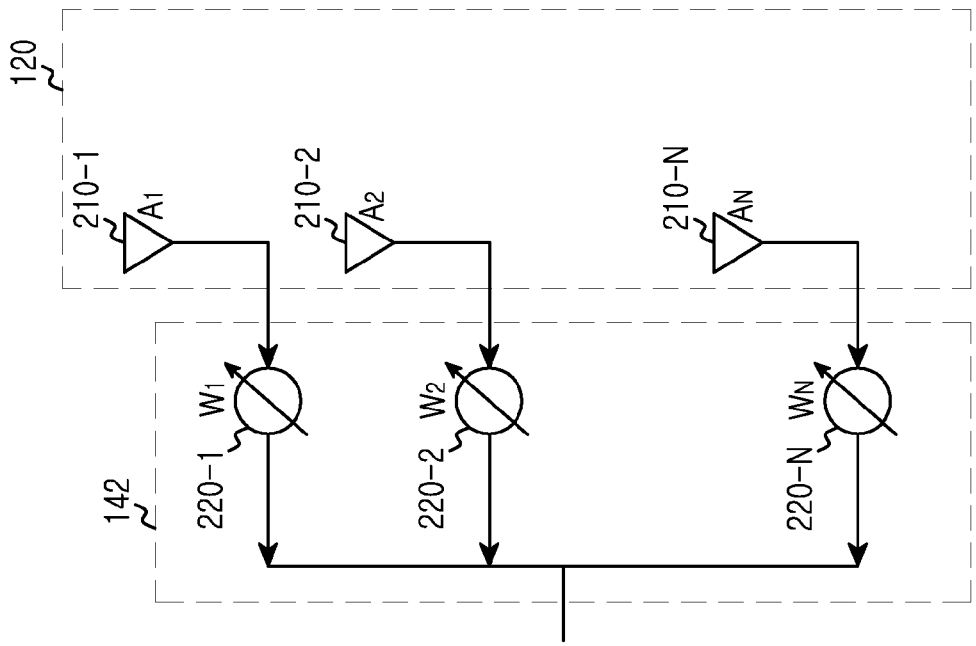
FIGS. 2A and 2B are block diagrams illustrating configurations of a Radio Frequency (RF) chain according to exemplary embodiments of the present invention.
Figure 2A:
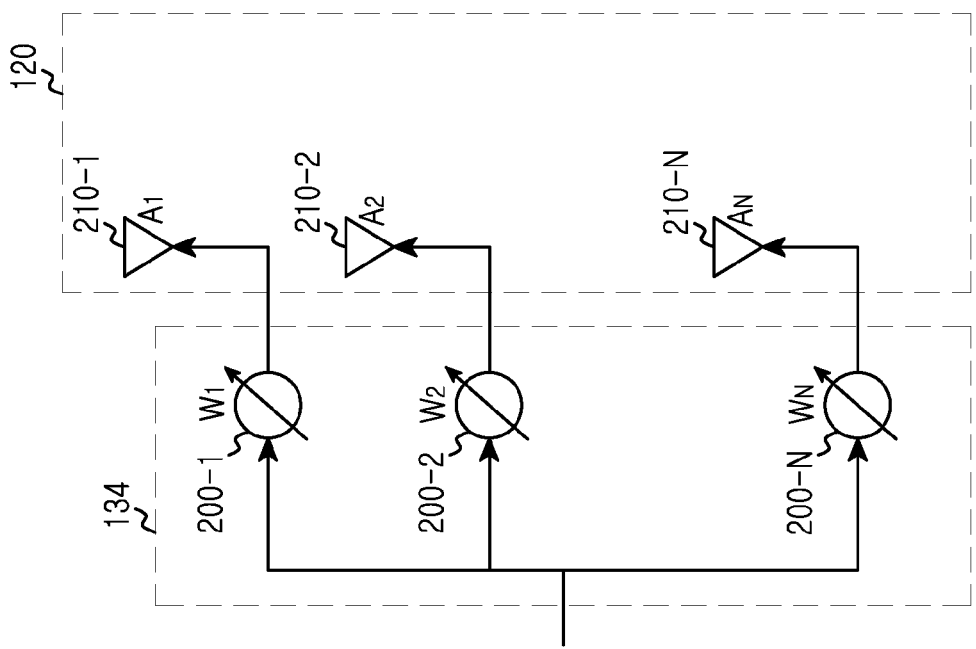

FIGS. 2A and 2B are block diagrams illustrating configurations of an RF chain according to exemplary embodiments of the present invention.

Figure 3:
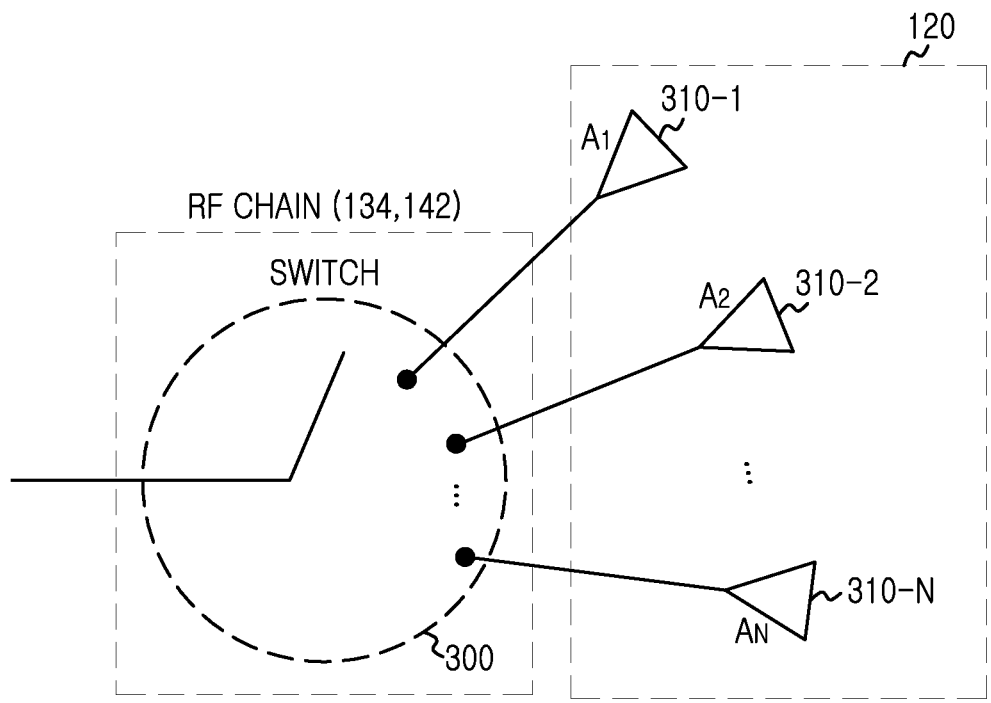
FIG. 3 is a block diagram illustrating a configuration of an RF chain according to an exemplary embodiment of the present invention.

Referring to FIGS. 2A and 2B, the antenna unit 120 includes a plurality of omnidirectional antennas 210-1 to 210-N. In an exemplary implementation, the antenna unit 120 may include a plurality of directional antennas 310-1 to 310-N for transmission of a signal in different directions as illustrated in FIG. 3.

The TX modem 132 encodes and modulates data to be transmitted to a receiving terminal through the antenna unit 120, converts a modulated signal into an analog signal, and outputs the analog signal. In this case, the TX modem 132 transmits an analog baseband signal to the TX RF chain 134.

The TX RF chain 134 includes a plurality of RF paths for transmission of a signal to the respective antennas. In this case, the TX RF chain 134 may use only some antennas and some RF paths according to a beam pattern and a beam width selected by the beam selecting unit 110.

The TX RF chain 134 multiplexes a baseband signal received from the TX modem 132 into at least one activated RF path, converts a relevant baseband signal on each RF path into an RF signal, and transmits the RF signal through the antenna unit 120. In this case, the TX RF chain 134 controls the baseband signal so that a beam is formed according to a beam pattern selected by the beam selecting unit 110. For example, when the antenna unit 120 includes a plurality of omnidirectional antennas, 210-1 to 210-N as illustrated in FIG. 2A, the TX RF chain 134 includes phase shift units 200-1 to 200-N for shifting the phases of signals transmitted through the RF paths of the respective antennas. The phase shift units 200-1 to 200-N shift the phases of signals to be transmitted through the respective antennas according to a beam pattern and a beam width selected by the beam selecting unit 110.

FIG. 3 is a block diagram illustrating a configuration of an RF chain according to an exemplary embodiment of the present invention.

Referring to FIG. 3, when the antenna unit 120 includes a plurality of directional antennas, 310-1 to 310-N, the TX RF chain 134 includes a switch 300 for connecting the TX modem 132 to a relevant antenna according to a beam pattern. The switch 300 connects the TX modem 132 to at least one antenna according to a beam pattern and a beam width selected by the beam selecting unit 110. Herein, the switch 300 may connect the TX modem 132 to at least one antenna.

The RX RF chain 142 includes a plurality of RF paths for reception of an RF signal through the respective antennas. In this case, the RX RF chain 142 may use only some antennas and some RF paths according to a beam pattern and a beam width selected by the beam selecting unit 110.

The RX RF chain 142 converts RF signals received from the respective antennas into baseband signals, and transmits the baseband signals to the RX modem 144. In this case, the RX RF chain 142 controls the baseband signals so that a beam is formed according to a beam pattern selected by the beam selecting unit 110. For example, when the antenna unit 120 includes a plurality of omnidirectional antennas, 210-1 to 210-N as illustrated in FIG. 2A, the RX RF chain 142 includes phase shift units 220-1 to 220-N for shifting the phases of signals received through the respective antennas. The phase shift units 220-1 to 220-N shift the phases of signals received through the respective antennas according to a beam pattern and a beam width selected by the beam selecting unit 110.

In an exemplary implementation, when the antenna unit 120 includes a plurality of directional antennas, 310-1 to 310-N as illustrated in FIG. 3, the RX RF chain 142 includes a switch 300 for connecting the RX modem 144 to a relevant antenna according to a beam pattern. The switch 300 connects the RX modem 144 to at least one antenna according to a beam pattern and a beam width selected by the beam selecting unit 110. Herein, the switch 300 may connect the RX modem 144 to at least one antenna.

The RX modem 144 converts an analog signal received through the RX RF chain 142 into a digital signal, and demodulates and decodes the digital signal.

The transmitting unit 130 and the receiving unit 140 of the transmitting terminal may share one antenna unit 120 with each other, may use different antenna units, or may be separate from each other.

Figure 4A:
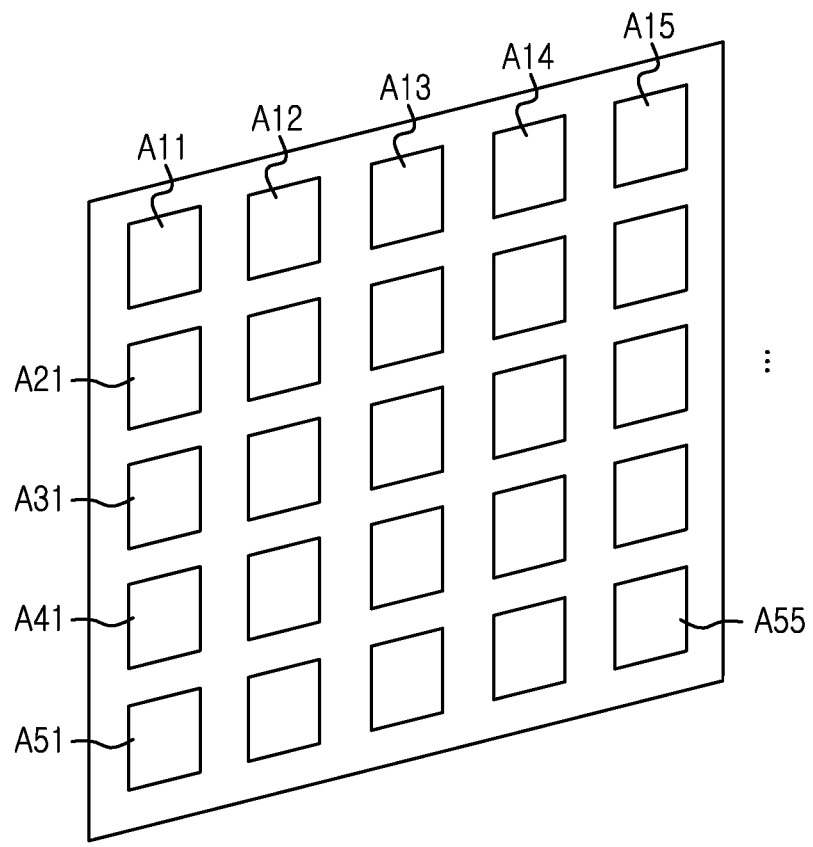
FIGS. 4A and 4B illustrate narrow beam patterns resulting from an antenna array according to exemplary embodiments of the present invention.
Figure 4B:
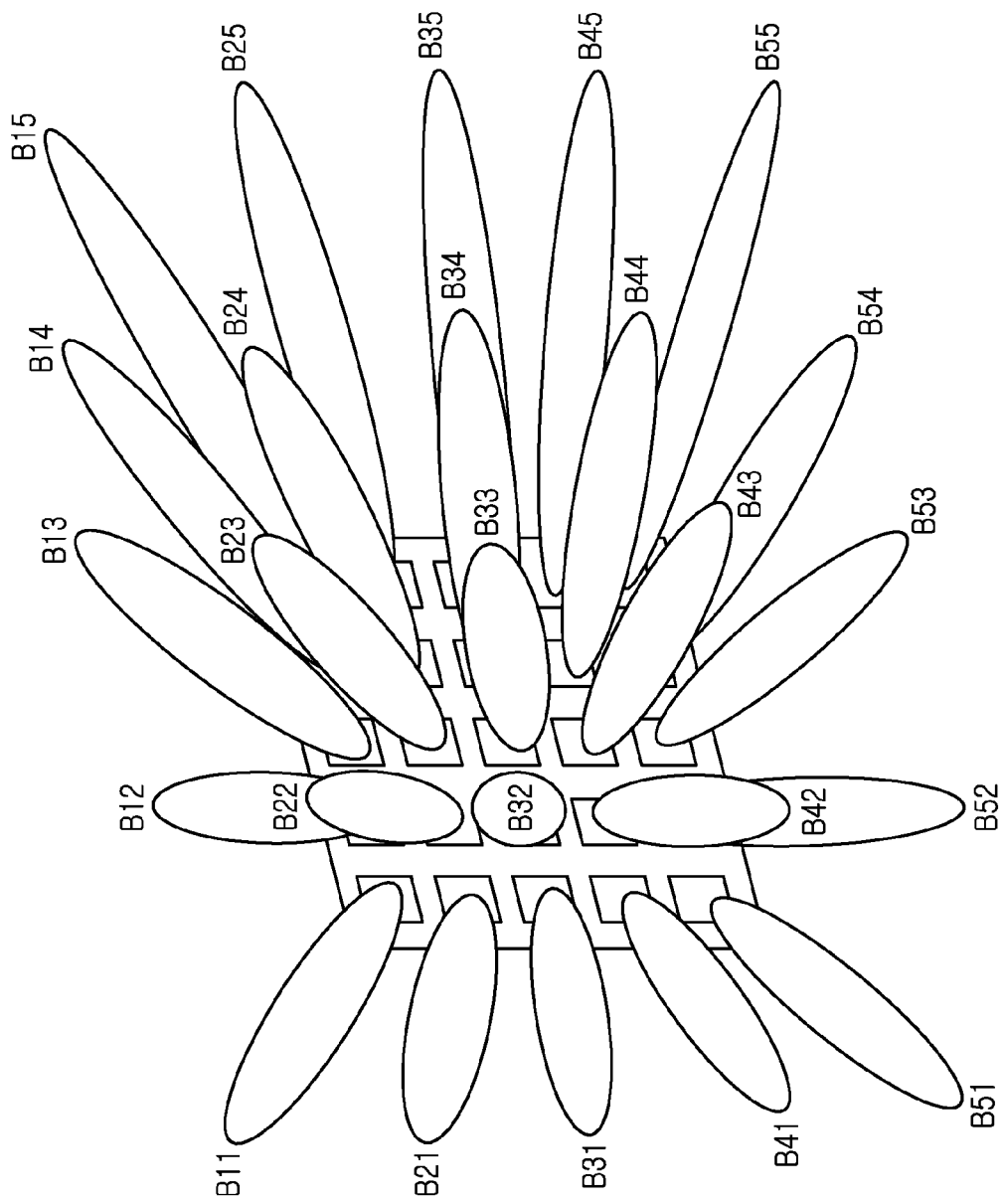
Figure 5B:
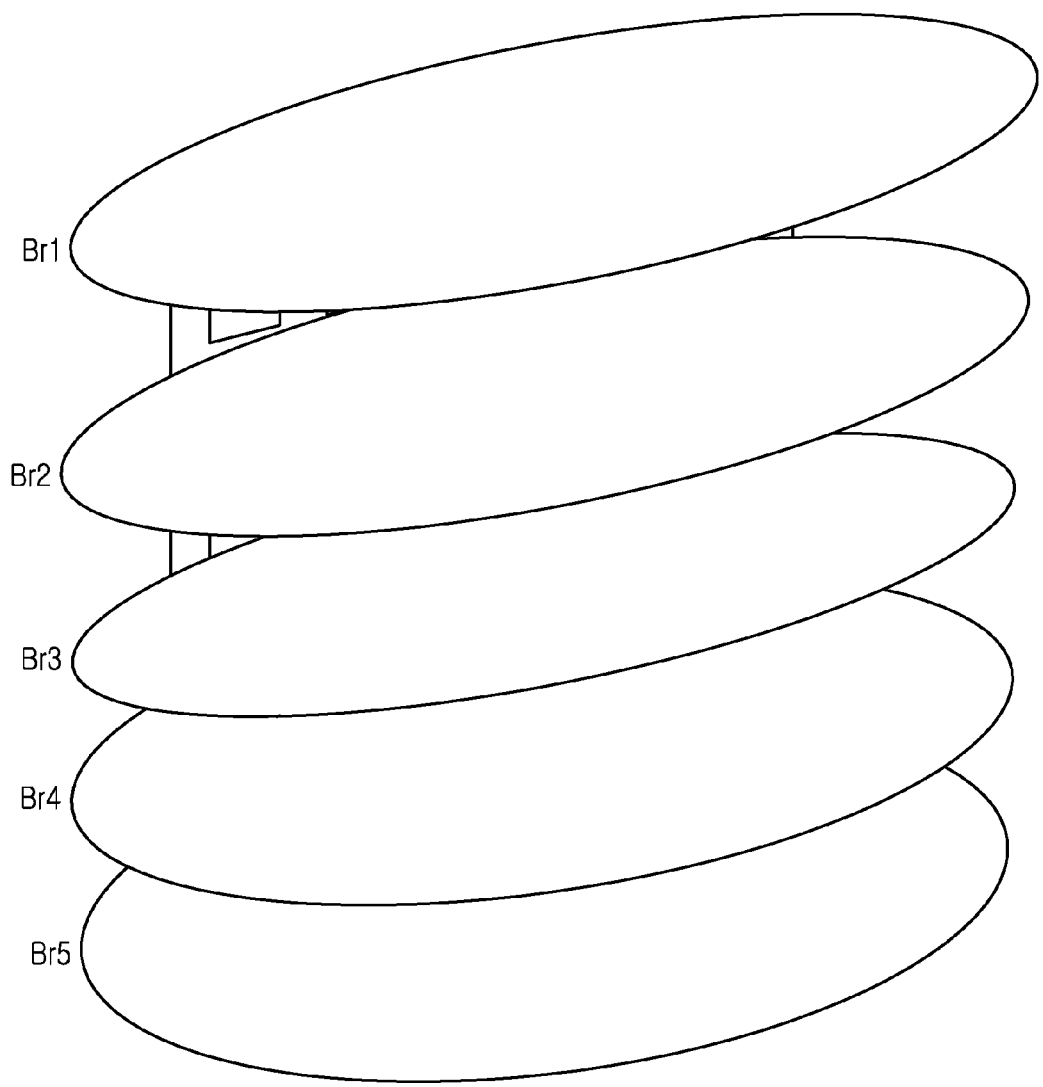

FIGS. 4A and 4B illustrate narrow beam patterns resulting from an antenna array according to exemplary embodiments of the present invention. FIGS. 5A and 5B illustrate wide beam patterns according to exemplary embodiments of the present invention.

As described above, the antenna unit 120 of the transmitting terminal may include a 5×5 antenna array as illustrated in FIG. 4A. In this case, the transmitting terminal may use the 5×5 antenna array to form a narrow beam as illustrated in FIG. 4B. For example, when the antenna unit 120 includes a plurality of directional antennas, 310-1 to 310-N as illustrated in FIG. 3, a beam width of the transmitting terminal increases with an increase in the number of antennas used to transmit/receive a signal. That is, if a directional antenna is used, a beam width of the transmitting terminal can be minimized when one antenna is used. Accordingly, the transmitting terminal forms a narrow beam by using the respective antennas.

As another example, when the antenna unit 120 includes a plurality of omnidirectional antennas, 210-1 to 210-N as illustrated in FIG. 2A or 2B, a beam width of the transmitting terminal decreases with an increase in the number of antennas used. Accordingly, the transmitting terminal may form narrow beams by shifting the phases of a plurality of antennas.

In addition, when the antenna unit 120 is configured as illustrated in FIG. 4A, the transmitting terminal may form a vertical beam as illustrated in FIG. 5A in order to transmit a sync signal and a common control signal. For example, when the antenna unit 120 includes directional antennas, the transmitting terminal generates a vertical beam by using the antennas included in one vertical array of the antenna unit 120. Specifically, when the transmitting terminal generates a vertical beam Bc1, only the antennas A11, A21, A31, A41 and A51 of the antenna unit 120 are turned on. In this case, the other antennas of the antenna unit 120 are turned off. As another example, when the antenna unit 120 includes omnidirectional antennas, the transmitting terminal generates a vertical beam by using the antennas included in one horizontal array of the antenna unit 120. Specifically, when the transmitting terminal generates a vertical beam Bc1, only the antennas A31, A32, A33, A34 and A35 of the antenna unit 120 are turned on. In this case, the other antennas of the antenna unit 120 are turned off.

In addition, in order to transmit a training signal, the transmitting terminal may form a vertical beam illustrated in FIG. 5A and a horizontal beam illustrated in FIG. 5B by using the antenna unit 120 configured as illustrated in FIG. 4A. For example, when directional antennas are used to form a horizontal beam, the transmitting terminal generates a horizontal beam by using the antennas included in one horizontal array of the antenna unit 120. Specifically, when the transmitting terminal generates a horizontal beam Br1 illustrated in FIG. 5B, only the antennas A11, A12, A13, A14 and A15 of the antenna unit 120 illustrated in FIG. 4A are turned on. In this case, the other antennas of the antenna unit 120 are turned off. As another example, when omnidirectional antennas are used to form a horizontal beam, the transmitting terminal generates a horizontal beam by using the antennas included in one vertical array of the antenna unit 120. Specifically, when the transmitting terminal generates a horizontal beam Br1 illustrated in FIG. 5B, only the antennas A13, A23, A33, A43 and A53 of the antenna unit 120 illustrated in FIG. 4A are turned on. In this case, the other antennas of the antenna unit 120 are turned off.

As described above, when a vertical beam is used, since a beam width is narrow in the horizontal direction, the transmitting terminal may reduce a horizontal interference by reducing the generation of multi-path fading in the horizontal direction. In addition, when a vertical beam is used, multi-path fading may occur in the receiving terminal due to signals reflected from the ground. However, since the signals reflected from the ground have a small difference in a moving distance and a moving time from a LoS (Line of Sight) signal, they have a very small interference caused by a vertical beam.

Hereinafter, an exemplary method for beamforming a TX signal by a transmitting terminal will be described.

Figure 6:
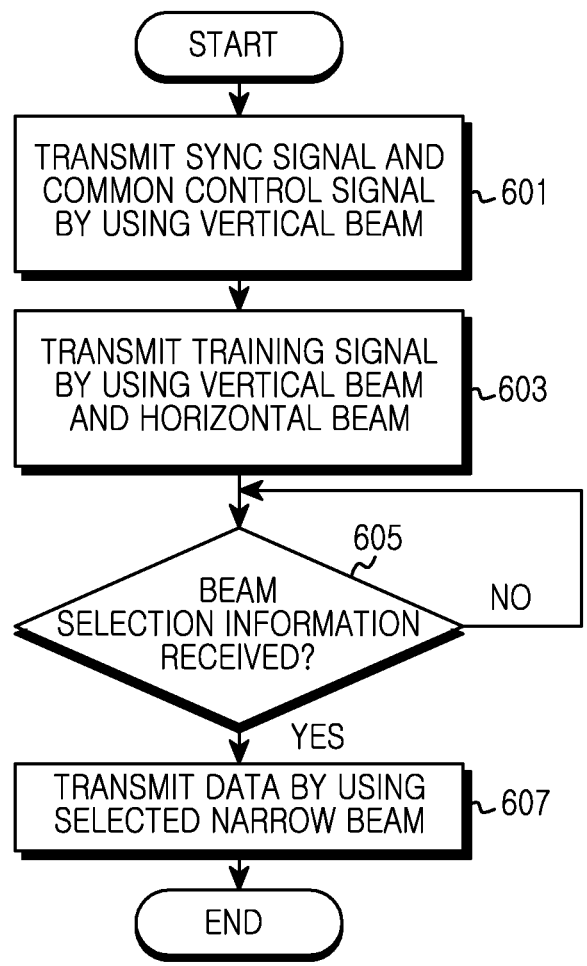
FIG. 6 is a flowchart illustrating a process for transmitting signals through beamforming by a transmitting terminal according to an exemplary embodiment of the present invention.

FIG. 6 is a flowchart illustrating a process for transmitting signals through beamforming by a transmitting terminal according to an exemplary embodiment of the present invention.

Referring to FIG. 6, in step 601, the transmitting terminal transmits at least one of a sync signal and a common control signal to a receiving terminal by using a vertical beam. For example, when a sync signal and a common control signal are transmitted, the transmitting terminal transmits the sync signal and the common control signal five times through vertical beams Bc1 to Bc5 illustrated in FIG. 5A. In this case, a horizontal width of the vertical beam may be equal to or larger than a horizontal width of a narrow beam.

Thereafter, in step 603, the transmitting terminal transmits a training signal by using a vertical beam and a horizontal beam. For example, the transmitting terminal transmits a training signal sequentially through five vertical beams Bc1 to Bc5 illustrated in FIG. 5A and five horizontal beams Br1 to Br5 illustrated in FIG. 5B. In this case, a horizontal width of the vertical beam is equal to a horizontal width of a narrow beam, and a vertical width of the horizontal beam is equal to a vertical width of the narrow beam.

Thereafter, in step 605, the transmitting terminal determines whether beam selection information is received from the receiving terminal. Herein, the beam selection information includes information on an optimal narrow beam of the receiving terminal.

When the beam selection information is received, the transmitting terminal proceeds to step 607. In step 607, the transmitting terminal transmits data to the receiving terminal through an optimal narrow beam selected by the receiving terminal. Thereafter, the transmitting terminal ends the present algorithm.

In the above exemplary implementation, when the beam selection information is not received, the transmitting terminal waits to receive the beam selection information. In another exemplary implementation, when the beam selection information is not received within a predefined time from the transmission of the training signal, the transmitting terminal may transmit the training signal again.

As described above, the transmitting terminal transmits data through a narrow beam selected by the receiving terminal. If a beam for transmission of data from the transmitting terminal to the receiving terminal is changed, the transmitting terminal may change a beam of the transmitting terminal so that a beam angle in the vertical direction is changed. In this case, the transmitting terminal converts a beam so that a beam change is maximum in the vertical direction. For example, when narrow beams illustrated in FIG. 4B are used, the transmitting unit converts beams in the order of B1$i$→B3$j$→B5$k$→B2$m$→B4$n$. Herein, i, j, k, m, n represent indexes of vertical direction antenna elements.

On the other hand, if a beam can be converted only in the horizontal direction, the transmitting terminal converts a beam so that a beam change is minimum in the horizontal direction. For example, when vertical beams illustrated in FIG. 5A are used, the transmitting terminal converts beams in the order of Bc1→Bc2→Bc3→Bc4→Bc5. Herein, c represents an index of a vertical direction antenna element.

Hereinafter, an exemplary method for receiving a beamformed signal of a transmitting terminal by a receiving terminal will be described.

Figure 7:
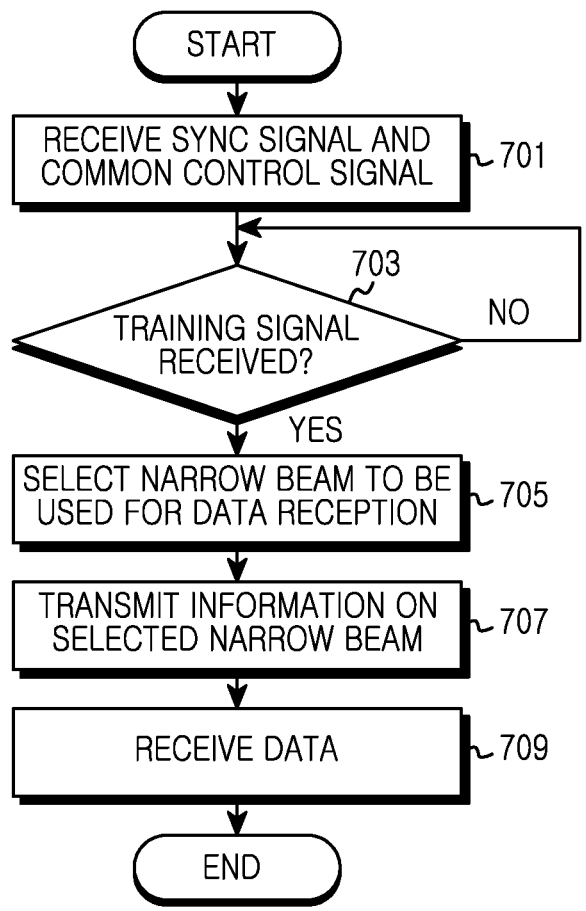
FIG. 7 is a flowchart illustrating a process for receiving signals by a receiving terminal according to an exemplary embodiment of the present invention.

FIG. 7 is a flowchart illustrating a process for receiving signals by a receiving terminal according to an exemplary embodiment of the present invention.

Referring to FIG. 7, in step 701, the receiving terminal receives at least one of a sync signal and a common control signal that are transmitted in a vertical beam by the transmitting terminal. For example, the receiving terminal receives a sync signal and a common control signal that are transmitted by the transmitting terminal through vertical beams illustrated in FIG. 5A.

Thereafter, in step 703, the receiving terminal determines whether a training signal is received. For example, the receiving terminal determines whether it receives a training signal that are transmitted by the transmitting terminal sequentially through five vertical beams Bc1 to Bc5 illustrated in FIG. 5A and five horizontal beams Br1 to Br5 illustrated in FIG. 5B.

When the training signal is received, the receiving terminal proceeds to step 705. In step 705, the receiving terminal selects a narrow beam for reception of data through the training signal received through the vertical beam and the horizontal beam. For example, when the transmitting terminal transmits the training signal through five vertical beams Bc1 to Bc5 illustrated in FIG. 5A and five horizontal beams Br1 to Br5 illustrated in FIG. 5B, the receiving terminal selects an optimal vertical beam among the above vertical beams and selects an optimal horizontal beam among the above horizontal beams. Thereafter, the receiving terminal selects a narrow beam corresponding to an overlap between the optimal vertical beam and the optimal horizontal beam as a narrow beam for reception of data. Herein, the optimal vertical beam includes a vertical beam having the highest RX power among the vertical beams, and the optimal horizontal beam includes a horizontal beam having the highest RX power among the horizontal beams.

Thereafter, in step 707, the receiving terminal transmits information on the selected narrow beam to the transmitting terminal.

In step 709, the receiving terminal receives data that is transmitted through the narrow beam by the transmitting terminal. Thereafter, the receiving terminal ends the present algorithm.

Figure 8:
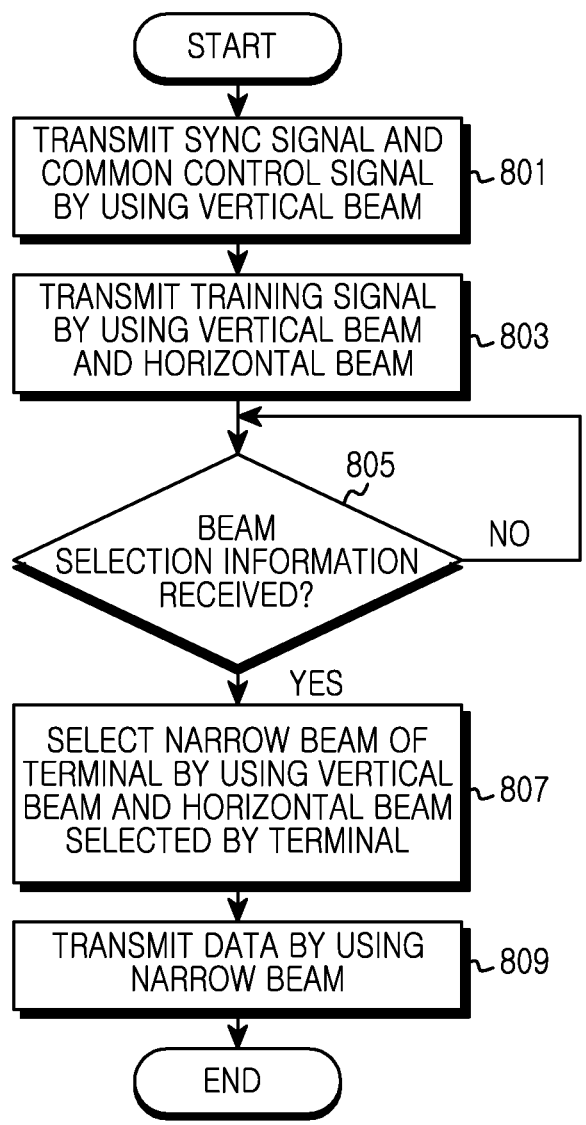
FIG. 8 is a flowchart illustrating a process for transmitting signals through beamforming by a transmitting terminal according to an exemplary embodiment of the present invention.

FIG. 8 is a flowchart illustrating a process for transmitting signals through beamforming by a transmitting terminal according to an exemplary embodiment of the present invention.

Referring to FIG. 8, in step 801, the transmitting terminal transmits at least one of a sync signal and a common control signal to a receiving terminal by using a vertical beam. For example, when a sync signal and a common control signal are transmitted, the transmitting terminal repeatedly transmits the sync signal and the common control signal five times through vertical beams Bc1 and Bc5 illustrated in FIG. 5A. In this case, a horizontal width of the vertical beam may be equal to or larger than a horizontal width of a narrow beam.

Thereafter, in step 803, the transmitting terminal transmits a training signal by using a vertical beam and a horizontal beam. For example, the transmitting terminal transmits a training signal sequentially through five vertical beams, Bc1 to Bc5 illustrated in FIG. 5A, and five horizontal beams, Br1 to Br5 illustrated in FIG. 5B. In this case, a horizontal width of the vertical beam is equal to a horizontal width of a narrow beam, and a vertical width of the horizontal beam is equal to a vertical width of the narrow beam.

Thereafter, in step 805, the transmitting terminal determines whether beam selection information is received from the receiving terminal. Herein, the beam selection information includes information on an optimal vertical beam and an optimal horizontal beam selected by the receiving terminal. Herein, the optimal vertical beam includes a vertical beam having the highest RX power among the vertical beams received by the receiving terminal, and the optimal horizontal beam includes a horizontal beam having the highest RX power among the horizontal beams received by the receiving terminal.

When the beam selection information is received, the transmitting terminal proceeds to step 807. In step 807, the transmitting terminal selects a narrow beam to be used to transmit data to the receiving terminal, by using the optimal vertical beam and the optimal horizontal beam selected by the receiving terminal. For example, the transmitting terminal selects a narrow beam corresponding to an overlap between the optimal vertical beam and the optimal horizontal beam selected by the receiving terminal, as a narrow beam to be used to transmit data to the receiving terminal.

In step 809, the transmitting terminal transmits data to the receiving terminal through the narrow beam selected in step 807. Thereafter, the transmitting terminal ends the present algorithm.

In the above exemplary implementation, when the beam selection information is not received, the transmitting terminal waits to receive the beam selection information. In another exemplary implementation, when the beam selection information is not received within a predefined time, the transmitting terminal may transmit the training signal again.

As described above, the transmitting terminal selects a narrow beam for transmission of data and transmits data to the receiving terminal through the narrow beam selected. If a beam for transmission of data from the transmitting terminal to the receiving terminal is changed, the transmitting terminal may change a beam of the transmitting terminal so that a beam angle in the vertical direction is changed. In this case, the transmitting terminal converts a beam so that a beam change is maximum in the vertical direction. For example, when narrow beams illustrated in FIG. 4B are used, the transmitting unit converts beams in the order of B1$i$→B3$j$→B5$k$→B2$m$→B4$n$. Herein, i, j, k, m, n represent indexes of vertical direction antenna elements.

On the other hand, if a beam can be converted only in the horizontal direction, the transmitting terminal converts a beam so that a beam change is minimum in the horizontal direction. For example, when vertical beams illustrated in FIG. 5A are used, the transmitting terminal converts beams in the order of Bc1→Bc2→Bc3→Bc4→Bc5. Herein, c represents an index of a vertical direction antenna element.

Hereinafter, an exemplary method for receiving a beamformed signal of a transmitting terminal by a receiving terminal will be described.

Figure 9:
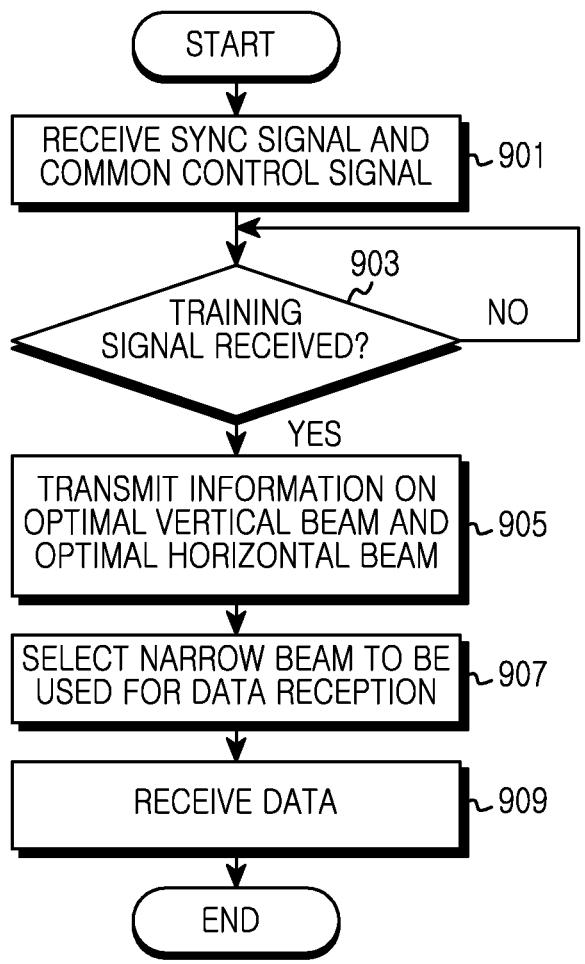
FIG. 9 is a flowchart illustrating a process for receiving signals by a receiving terminal according to an exemplary embodiment of the present invention.

FIG. 9 is a flowchart illustrating a process for receiving signals by a receiving terminal according to an exemplary embodiment of the present invention.

Referring to FIG. 9, in step 901, the receiving terminal receives at least one of a sync signal and a common control signal that are transmitted through a vertical beam by a transmitting terminal. For example, the receiving terminal receives at least one of a sync signal and a common control signal that are transmitted by the transmitting terminal through vertical beams illustrated in FIG. 5A.

Thereafter, in step 903, the receiving terminal determines whether a training signal is received. For example, the receiving terminal determines whether it receives a training signal that is transmitted by the transmitting terminal sequentially through five vertical beams, Bc1 to Bc5 illustrated in FIG. 5A, and five horizontal beams, Br1 to Br5 illustrated in FIG. 5B.

When the training signal is received, the receiving terminal proceeds to step 905. In step 905, the receiving terminal transmits information on an optimal vertical beam and an optimal horizontal beam to the transmitting terminal. For example, when the transmitting terminal transmits the training signal sequentially through five vertical beams, Bc1 to Bc5 illustrated in FIG. 5A, and five horizontal beams, Br1 to Br5 illustrated in FIG. 5B, the receiving terminal selects an optimal vertical beam and an optimal horizontal beam prior to transmission to the transmitting terminal. Herein, the optimal vertical beam includes a vertical beam having the highest RX power among the vertical beams, and the optimal horizontal beam includes a horizontal beam having the highest RX power among the horizontal beams.

Thereafter, in step 907, the receiving terminal selects a narrow beam to be used for data reception, by using the optimal vertical beam and the optimal horizontal beam. For example, the receiving terminal selects a narrow beam corresponding to an overlap between the optimal vertical beam and the optimal horizontal beam as a narrow beam to be used for data reception.

In step 909, the receiving terminal transmits information on the selected narrow beam to the transmitting terminal and receives data through the narrow beam. Thereafter, the receiving terminal ends the present algorithm.

Hereinafter, a configuration of a receiving terminal for receiving signals from a transmitting terminal will be described.

Figure 10:
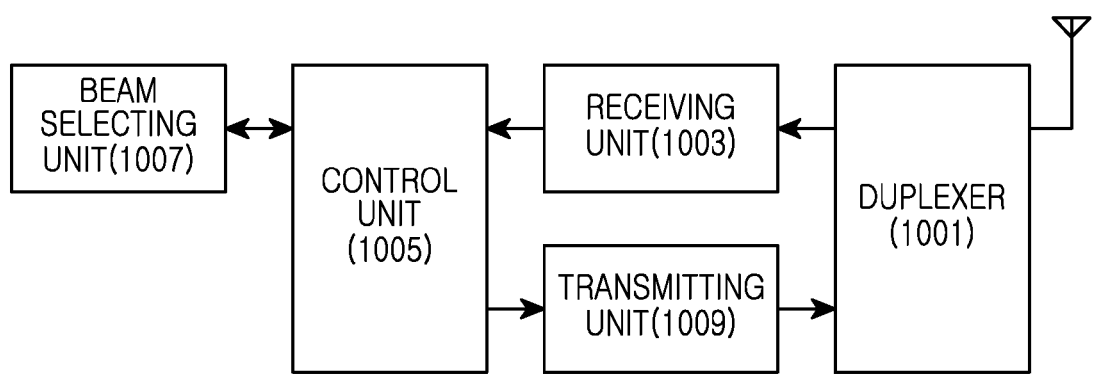
FIG. 10 is a block diagram illustrating a configuration of a receiving terminal according to an exemplary embodiment the present invention.

FIG. 10 is a block diagram illustrating a configuration of a receiving terminal according to an exemplary embodiment of the present invention.

Referring to FIG. 10, the receiving terminal may include a duplexer 1001, a receiving unit 1003, a control unit 1005, a beam selecting unit 1007, and a transmitting unit 1009.

According to a duplexing scheme, the duplexer 1001 transmits a TX signal, which is received from the transmitting unit 1009, through an antenna and provides an RX signal, which is received from the antenna, to the receiving unit 1003.

The receiving unit 1003 converts an RF signal, which is received from the duplexer 1001, into a baseband signal prior to demodulation. For example, the receiving unit 1003 may include an RF processing block, a demodulating block, a channel decoding block, and a message processing block. The RF processing block converts an RF signal, which is received from the duplexer 1001, into a baseband signal prior to output. The demodulating block performs a Fast Fourier Transform (FFT) operation on a signal received from the RF processing block, to extract data carried on each subcarrier. The channel decoding block may include a demodulator, a deinterleaver, and a channel decoder. The message processing block extracts control information from an RX signal and provides the same to the control unit 1005.

The control unit 1005 controls an overall operation of the receiving terminal. For example, the control unit 1005 controls the beam selecting unit 1007 to select a beam for data reception.

The beam selecting unit 1007 selects an optimal vertical beam among a plurality of vertical beams through which a training signal is received from a transmitting terminal, and selects an optimal horizontal beam among a plurality of horizontal beams through which a training signal is received from the transmitting terminal. For example, the beam selecting unit 1007 selects a vertical beam with the highest RX power as an optimal vertical beam, and selects a horizontal beam with the highest RX power as an optimal horizontal beam.

Thereafter, the beam selecting unit 1007 selects a narrow beam corresponding to an overlap between the optimal vertical beam and the optimal horizontal beam as a narrow beam for data reception.

The transmitting unit 1009 encodes a control message and data to be transmitted to the transmitting terminal, converts the same into an RF signal, and transmits the RF signal to the duplexer 1001. For example, the transmitting unit 1009 may include a message generating block, a channel encoding block, a modulating block, an RF processing block, and the like.

The message generating block generates a control message including information on the narrow beam selected by the beam selecting unit 1007. For example, the message generating block generates a control message including information on the narrow beam selected by the beam selecting unit 1007. In another exemplary implementation, the message generating block generates a control message including information on the optimal vertical beam and the optimal horizontal beam selected by the beam selecting unit 1007.

The channel encoding block may include a modulator, an interleaver, a channel encoder, and the like. The modulating block maps a signal received from the channel encoding block to each subcarrier through an Inverse FFT (IFFT) operation. The RF processing block converts a baseband signal received from the modulating block into an RF signal, and outputs the RF signal to the duplexer 1001.

As described above, an exemplary embodiment of the present invention transmits a sync signal and a common control signal through a horizontally-narrow and vertically-wide beam in a wireless communication system using a beamforming technique. Accordingly, the number of times of transmitting the sync signal and the common control signal can be reduced, and an overhead and interference caused by repeated transmission of the sync signal and the common control signal through a narrow beam can be reduced.

Furthermore, an exemplary embodiment of the present invention transmits a training signal through a horizontally-narrow and vertically-wide beam in the wireless communication system. Accordingly, the number of times of transmitting the training signal can be reduced, and an overhead and interference caused by transmission of the training signal through a narrow beam can be reduced.

In addition, if a beam needs to be changed in the wireless communication system, the beam is changed by selecting a beam with a different vertical beam angle. Accordingly, an interference caused by a beam change can be reduced.

Moreover, when a signal is transmitted through a plurality of beams by a transmitting terminal in the wireless communication system, beams with the same vertical beam angle are not simultaneously used. Accordingly, an interference caused by simultaneous transmission of a plurality of beams can be reduced.

It will be appreciated that exemplary embodiments of the present invention according to the claims and description in the specification can be realized in the form of hardware, software or a combination of hardware and software.

Any such software may be stored in a computer readable storage medium. The computer readable storage medium stores one or more programs (i.e., software modules), the one or more programs comprising instructions, which when executed by one or more processors in an electronic device, cause the electronic device to perform a method of the present invention.

Any such software may be stored in the form of a volatile or a non-volatile storage, for example, a storage device, such as a Read Only Memory (ROM), whether erasable or rewritable or not, or in the form of memory such as, for example, a Random Access Memory (RAM), memory chips, device or integrated circuits or on an optically or magnetically readable medium, such as a Compact Disc (CD), a Digital Video Disc (DVD), a magnetic disk or a magnetic tape, and the like. It will be appreciated that the storage devices and storage media are exemplary embodiments of machine-readable storage that are suitable for storing a program or programs comprising instructions that, when executed, implement exemplary embodiments of the present invention.

Accordingly, exemplary embodiments of the present invention provide a program comprising code for implementing an apparatus or a method as claimed in any one of the claims of this specification and a machine-readable storage storing, such a program. Furthermore, such programs may be conveyed electronically via any medium, such as a communication signal carried over a wired or wireless connection and exemplary embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a transmitter in a wireless communication system, the method comprising:
    transmitting training signals with beamforming using a first set of beams and a second set of beams; and
    transmitting data signals with beamforming using at least one beam among a third set of beams,
    wherein the first set of beams comprises a plurality of beams where a horizontal beam width is narrower than a vertical beam width,
    wherein the second set of beams comprises a plurality of beams where a horizontal beam width is wider than a vertical beam width, and
    wherein the at least one beam comprises a beam having a direction which overlaps a first beam among the first set of beams and a second beam among the second set of beams.

2. The method of claim 1, further comprising transmitting at least one of a synchronization signal and a control signal with beamforming using the first set of beams, before transmitting the training signals.

3. The method of claim 1, wherein the first set of beams and the third set of beams are equal in horizontal beam width, and wherein the second set of beams and the third set of beams are equal in vertical beam width.

4. The method of claim 1, further comprising:
    receiving information for beam selection from a receiver; and
    determining a selected beam based on the information received from the receiver.

5. The method of claim 1, further comprising:
    receiving information for beam selection from a receiver;
    determining the first beam among the first set of beams and the second beam among the second set of beams based on the information received from the receiver; and
    determining a selected beam based on the first beam and the second beam.

6. The method of claim 1, further comprising:
    determining at least one other beam for transmitting data signals among beams having a vertically-different beam direction from the at least one beam; and
    transmitting the data signals with beamforming using the at least one other beam.

7. The method of claim 1, wherein the transmitting of the data signals comprises,
    transmitting, to a plurality of receivers, data signals with beamforming using a plurality of beams having vertically-different beam directions.

8. The method of claim 1,
    wherein the first beam and the second beam are selected by a receiver.

9. An apparatus of a transmitter in a wireless communication system, the apparatus comprising:
    a transmitting unit configured to:
        transmit a training signal with beamforming using a first set of beams and a second set of beams, and
        transmit data signals with beamforming using at least one beam among a third set of beams,
    wherein the first set of beams comprises a plurality of beams where a horizontal beam width is narrower than a vertical beam width,
    wherein the second set of beams comprises a plurality of beams where a horizontal beam width is wider than a vertical beam width, and
    wherein the at least one beam comprises a beam having a direction which overlaps a first beam among the first set of beams and a second beam among the second set of beams.

10. The apparatus of claim 9, wherein the transmitting unit is further configured to transmit at least one of a synchronization signal and a control signal with beamforming using the first set of beams before transmitting the training signals.

11. The apparatus of claim 9, wherein the first set of beams and the third set of beams are equal in horizontal beam width, and wherein the second set of beams and the third set of beams are equal in vertical beam width.

12. The apparatus of claim 9, further comprising:

a control unit configured to activate at least one antenna among a plurality of antennas according to a beam pattern for signal transmission.

13. The apparatus of claim 9, further comprising:

a receiving unit configured to receive information for beam selection from a receiver; and a control unit configured to determine at least one selected beam based on the information received at the receiving unit.

14. The apparatus of claim 9, further comprising:

a receiving unit configured to receive information for beam selection from a receiver; and a control unit configured to:
    determine the first beam among the first set of beams and the second beam among the second set of beams based on the information, and
    determine at least one selected beam based on the first beam and the second beam.

15. The apparatus of claim 9, further comprising:

a control unit configured to:
    determine at least one other beam for transmitting data signals among beams having a vertically-different beam direction from the at least one beam, and
    control to transmit the data signals with beamforming using the at least one other beam.

16. The apparatus of claim 9, wherein the transmitting unit is further configured to transmit, to a plurality of receivers, data signals with beamforming using a plurality of beams having vertically-different beam directions.

17. The apparatus of claim 9, wherein the first beam and the second beam are selected by a receiver.

\* \* \* \* \*